United States Patent [19]

Stockdale

[11] Patent Number: 4,511,762

[45] Date of Patent: Apr. 16, 1985

[54] OVERLOAD DETECTION AND CONTROL SYSTEM FOR A TELECOMMUNICATIONS EXCHANGE

[75] Inventor: Robert Stockdale, West Palm Beach, Fla.

[73] Assignee: Siemens Corporate Research & Support, Inc., Iselin, N.J.

[21] Appl. No.: 501,940

[22] Filed: Jun. 6, 1983

[51] Int. Cl.³ .................... H04M 15/10; H04M 3/28
[52] U.S. Cl. .................................... 179/9; 179/18 EB
[58] Field of Search ................ 179/10, 7.1 R, 18 AB, 179/18 EB, 9, 8 A, 8 R, 7 R, 18 EE, 18 EA, 18 ES; 178/3

[56] References Cited

U.S. PATENT DOCUMENTS 4,165,447 8/1979 Bertoglio et al. .............. 179/18 EE
4,192,973 3/1980 Williams et al. ................ 179/18 ES

FOREIGN PATENT DOCUMENTS 1278150 9/1968 Fed. Rep. of Germany.

*Primary Examiner*—Stafford D. Schreyer
*Attorney, Agent, or Firm*—Karl F. Milde, Jr.

[57] ABSTRACT

A method and apparatus for detecting and managing overloads in a telecommunications exchange having a central processor for controlling certain operations of the exchange, line/trunk groups connected to the central processor which include telecommunication trunks and/or subscriber lines, and a switching network connected to the central processor and to the line/trunk group which enables telecommunication trunks and/or subscriber lines to communicate with one another. The exchange also includes apparatus for sending a message to the central processor whenever the telecommunication trunks and/or subscriber lines are to communicate with one another, and apparatus for the central processor to receive the message and send a responsive message back to the line/trunk group. Detection of the system overload is based upon the time for the central processor to send a responsive message to the line/trunk group, and management of this overload is accomplished by the line/trunk group changing between operational levels in response to the measured time.

25 Claims, 10 Drawing Figures

OVERLOAD DETECTION AND CONTROL SYSTEM FOR A TELECOMMUNICATIONS EXCHANGE

BACKGROUND OF THE INVENTION

This invention relates to detection and control of overloads in a telecommunications exchange.

A telecommunications exchange, such as a telephone exchange, which comprises a plurality of subscriber lines and trunks, which selectively communicate with each other via a switching network, is controlled by a central processor. The processor must oversee all incoming and outgoing telephone traffic because it controls connection and disconnection of all calls. Consequently, the speed with which the exchange can process traffic and the maximum traffic the exchange can handle is limited by the speed of the central processor in routing calls.

Whenever, traffic exceeds a certain level, such as during holidays, the central process must restrict traffic by giving priority to certain calls. This detection and management of excessive traffic requires additional processor time which increases the existing overload because there is a reduction in available processor time to handle telephone traffic.

SUMMARY OF THE INVENTION

It is accordingly an object of the present invention to provide a telecommunications exchange which can efficiently handle system overloads.

It is a further object of the present invention to provide a telecommunications exchange where both detection and management of system overloads occurs outside the exchange's central processor.

It is a further object of the present invention to provide an exchange in which local overloads, at the point where subscriber lines and trunks interface with the exchange, can be both detected and managed.

It is a further object of the present invention to provide an exchange in which local overloads can be both detected and managed outside the exchange's central processor.

It is a still further object of the present invention to provide an exchange in which both system and local overloads can be detected and managed with only minimal use of central processor time.

In general, the invention features, in one aspect, apparatus for a telecommunications exchange having a central processor for controlling certain operations of the exchange, and a plurality of line/trunk groups connected to the central processor. Each line/trunk group has a plurality of telecommunication trunks for receiving and transmitting telecommunication signals.

A switching network connected to the central processor and to the line/trunk group enables communication between telecommunication trunks. The switching network is associated with the line/trunk group and the central processor so that a message can be sent from the line/trunk group to the central processor, and a responsive message can be sent from the central processor to the line/trunk group whenever telecommunication trunks want to communicate with each other.

Each line/trunk group also has apparatus for detecting system overloads. This apparatus is associated with the line/trunk group to measure the time for the central processor to send a responsive message to the line/trunk group in resonse to the message sent by the line/trunk group to the central processor. This apparatus determines the system overload in response to this measured time.

In another aspect, the invention features apparatus for a telecommunications exchange having a central processor for controlling certain operations of the exchange, and a plurality of line/trunk groups connected to the central processor. Each line/trunk group has a plurality of subscriber lines for receiving and transmitting telecommunication signals.

A switching network connected to the central processor and to the line/trunk group enables communication between the subscriber lines. The switching network is associated with the line/trunk group and the central processor so that a message can be sent from the line/trunk group to the central processor, and a responsive message can be sent from the central processor to the line/trunk group whenever subscriber lines want to communicate with each other.

Each line/trunk group also has apparatus for detecting system overloads. This apparatus is associated with the line/trunk group to measure the time for the central processor to send a responsive message to the line/trunk group in response to the message sent by the line/trunk group to the central processor. This apparatus determines the system overload in response to this measured time.

In another aspect, the invention features apparatus for a telecommunications exchange having a central processor for controlling certain operations of the exchange, and a plurality of line/trunk groups connected to the central processor. Each line/trunk group has at least one telecommunication trunk and at least one subscriber line for receiving and transmitting telecommunication signals.

A switching network connected to the central processor and to the line/trunk group enables communication between subscriber lines and trunks. The switching network is associated with the line/trunk group and the central processor so that a message can be sent from the line/trunk group to the central processor, and a responsive message can be sent from the central processor to the line/trunk group whenever subscriber lines and trunks want to communicate.

Each line/trunk group also has apparatus for detecting system overloads. This apparatus is associated with the line/trunk group to measure the time for the central processor to send a responsive message to the line/trunk group in response to the message sent by the line/trunk group to the central processor. This apparatus determines the system overload in response to this measured time.

In preferred embodiments the line/trunk groups have apparatus for comparing the measured time with at least one predetermined threshold to determine the system overload condition based on the relative values of the measured time and the predetermined threshold; the line/trunk group has apparatus for determining the average of successive measurements of time to determine the system overload based on this average; the line/trunk group has apparatus for comparing this average with at least one predetermined threshold to determine the system overload based on the relative values of this average and the predetermined threshold; the line/trunk group has apparatus to change from at least one operational level to at least one other operational level in response to the system overload; the exchange is a digital telecommunications exchange, in which the line/trunk group has a local processor, a memory associated the local processor and apparatus for determining the local overload of the line/trunk group; this apparatus determines the amount of memory available when the subscriber lines and trunks want to communicate, and the local overload condition is determined from the amount of memory available; the line/trunk group has apparatus to compare the amount of memory available with a predetermined threshold to determine the local overload condition; the line/trunk group has a local processor with adequate capacity to be periodically in an idle state, and the frequency of detection of this idle state determines detection of a local overload condition; the line/trunk group has apparatus to compare the frequency of detection of the idle state with a predetermined threshold to determine the local overload condition based on the relative values of the frequency of detection of the idle state and the predetermined threshold; the line/trunk group changes from at least one operational level to at least one other operational level in response to said local overload condition.

In another aspect, the invention features a method of determining a system overload in a telecommunication exchange which includes the steps of sending a message from a line/trunk group, having a plurality of telecommunication trunks, to a central processor, whenever the telecommunication trunks, are to communicate with each other. A responsive message is then sent from the central processor to the line/trunk group in response to the message sent from the line/trunk to the central processor. The time for the responsive mesage to be sent to the line/trunk group is then measured and the system overload condition is determined from this time.

In another aspect, the invention features a method of determining a system overload in a telecommunications exchange which includes the steps of sending a message from a line/trunk group, having a plurality of subscriber lines, to a central processor, whenever the subscriber lines are to communicate with one another. A responsive message is then sent from the central processor to the line/trunk group in response to the message sent from the line/trunk group to the central processor. The time for the responsive message to be sent to the line/trunk group is then measured and the system overload condition is detemined from this time.

In another aspect, the invention features a method of determining a system overload in a telecommunications exchange, which includes the steps of sending a message from a line/trunk group, having at least one subscriber line and at least one telecommunication trunk, to a central processor, whenever the subscriber line and trunk are to communicate. A responsive message is then sent from the central processor to the line/trunk group in response to the message sent from the line/trunk group to the central processor. The time for the responsive message to be sent to the line/trunk group is then measured and the system overload condition is determined from this time.

In preferred embodiments successive measurements of time made by the line/trunk group are averaged and the system overload condition is based on this average; this average is compared with at least one predetermined threshold and the system overload is determined based on the relative values of the average and the predetermined threshold; the measured time can also be compared with at least one predetermined threshold and the system overload is determined based on the relative values of the time and the predetermined threshold; the line/trunk group is changed from at least one operational level to at least one other operational level so that the telecommunications exchange can handle the system overload condition. The method of determining the local overload condition in the line/trunk group of a digital exchange, which has a line/trunk with a local processor and an associated memory, which includes determining the amount of memory available whenever the subscriber lines or trunks are to communicate and determining the local overload condition based on the amount of memory available.

In preferred embodiments the method of determining the local overload includes the steps of comparing the amount of memory with at least one predetermined threshold, and determining the local overload based on the relative values of the amount of memory and the predetermined threshold; the method of handling the local overload includes the steps of changing from at least one operational level to at least one other operational level so that the exchange can handle the overload.

The method of determining the local overload condition in the line/trunk group of a digital exchange, which has a local line/trunk group processor which has adequate capacity to be periodically idle, which includes detecting the frequency of the idle state and determining the local overload condition based on the frequency of the idle state.

In preferred embodiments the method of determining the local overload condition includes comparing the frequency of the idle level with at least one predetermined threshold and determining the local overload based on the relative values of the frequency of the idle level and the predetermined threshold; the method of handling the local overload includes the step of changing from at least one operational level to at least one other operational level so that the exchange can handle the overload.

This invention greatly improves the ability of a telecommunications exchange to handle traffic because central processor time is not required to detect overloads of the entire exchange or of individual line/trunk groups. In addition, only minimal central processor time is required to oversee overload management because the line/trunk groups provide continuous management of such overloads. The central processor merely checks the overload management periodically.

Other features and advantages of the invention will be apparent from the following detailed description, and from the claims.

For a full understanding of the present invention, reference should now be made to the following detailed description and to the accompanying drawings.

DETAILED DESCRIPTION

An embodiment of the invention will now be described with reference to the drawings.

Figure 1:
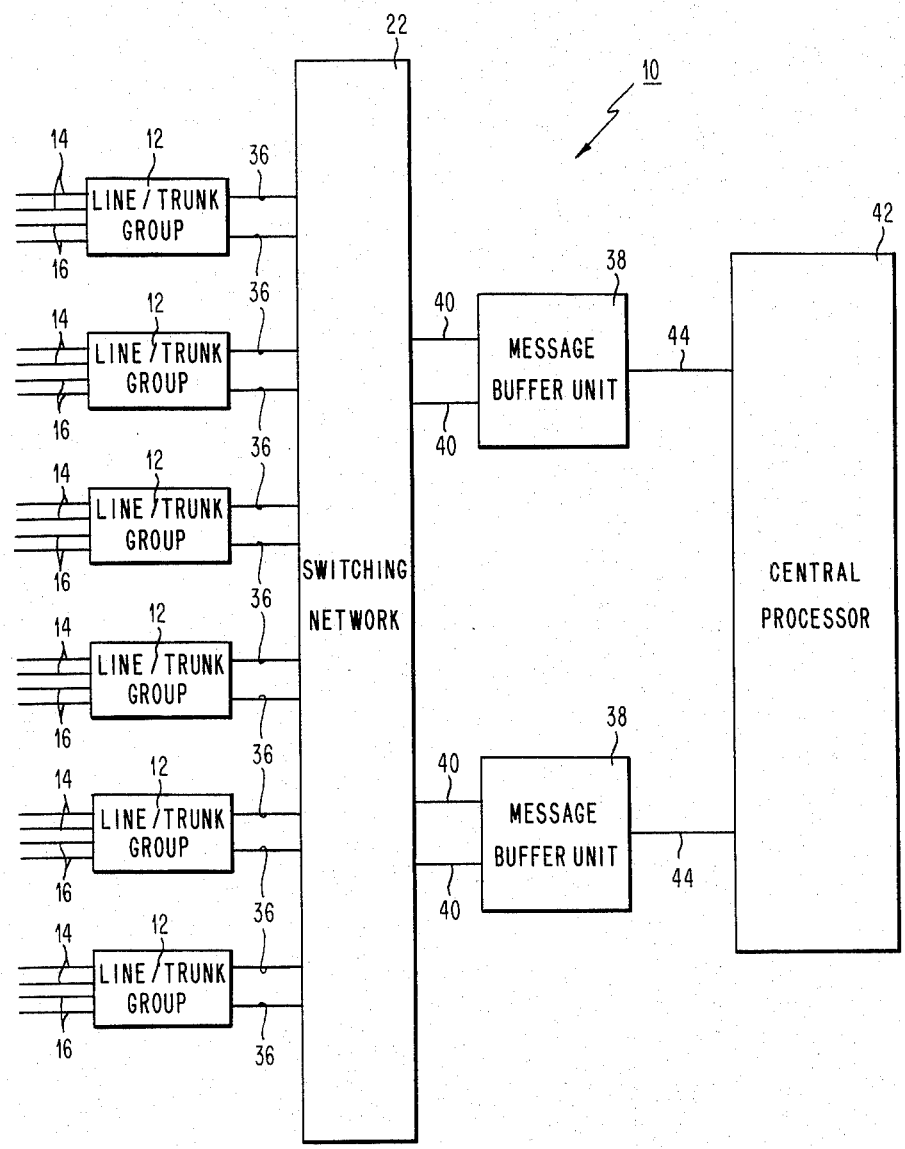
FIG. 1 is a diagrammatic view of the preferred embodiment.

Referring to FIG. 1, the system overload detection and control mechanism is an integral part of telephone exchange 10, which will now be described in detail. The exchange consists of numerous line/trunk groups 12, which are each connected to incoming and/or outgoing telephone trunks 14 and/or telephone subscriber lines 16. The exchange allows a telephone subscriber, typically a local user connected to a subscriber line 16, to be connected to another local user or to a trunk. The local user can communicate with other subscribers or trunks connected to the same or any other line/trunk group.

Figure 2:
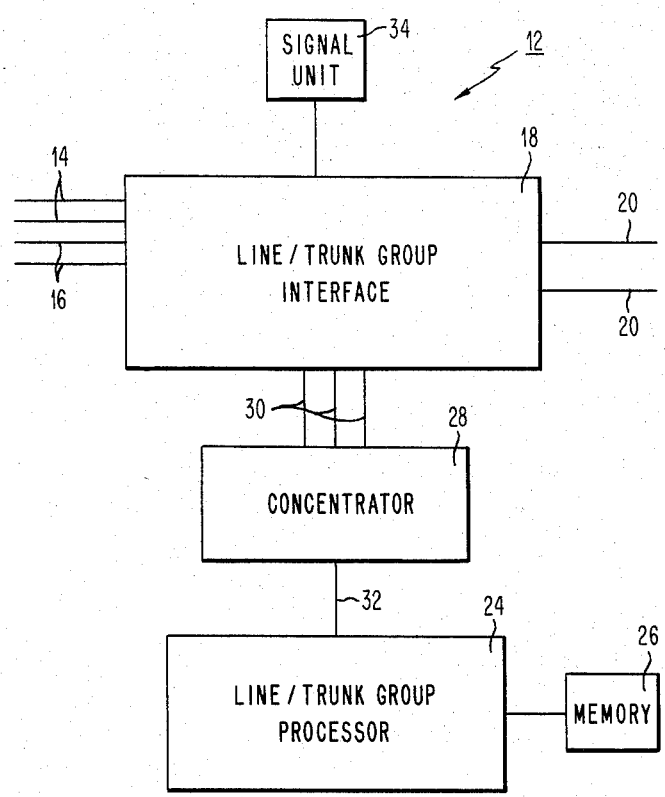
FIG. 2 is a detailed diagrammatic view of a line/trunk group shown in FIG. 1.

Referring to FIG. 2, a detailed diagram of a line/trunk group 12 is shown. Trunks 14 and subscriber lines 16 are physically connected to interface 18 of the the line/trunk groups. Lines 20 connect the interface of the line/trunk group to switching network 22, shown in FIG. 1.

Line/trunk group processor 24, typically an Intel 8086 microprocessor, controls operation of the line/trunk group by operating in accordance with instructions stored in memory 26. Processor 24 is coupled to line/trunk group interface 18 by concentrator 28, which concentrates multiple signals from, and distributes multiple signals to the interface over lines 30 and line 32.

Signal unit 34 provides local subscribers, connected to the line/trunk group via lines 16, with tones, such as a dial, ringing and busy tones. The signal unit also provides tones, such as, ringing and busy tones to trunks.

Referring to FIG. 1, each line/trunk group is connected to switching network 22 via lines 36. The switching network provides the actual path for data to flow from a subscriber line or trunk to another subscriber line or trunk. Message buffer units 38, connected to the switching network via lines 40 and to the central processor 42 via lines 44, act as interfaces between the central processor and the switching network. Each message buffer unit concentrates signals from and distributes signals to several line/trunk groups.

Figure 3:
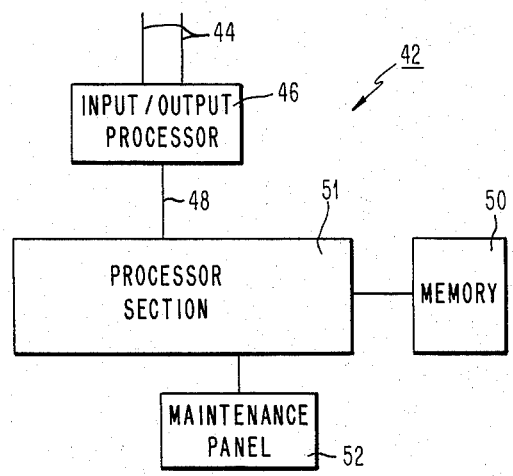
FIG. 3 is a detailed diagrammatic view of the central processor shown in FIG. 1.

Referring to FIG. 3, central processor 42 of FIG. 1 is shown in more detail.

Input/output processor 46 provides an interface between the central processor and the message buffer units, which concentrates signals on lines 44, into a single signal on line 48. Processor 46 also distributes signals from the central processor to the message buffer units.

The central processor has processor section 51, typically a Siemens Switching Processor 103 which has a maximum 8 megabytes of memory. This processor section operates with memory 50 to control the exchange.

Maintenance panel 52 is a housekeeping panel which continuously displays the status of the telephone exchange.

An example of the switch described in this section is the DE-4 switch sold internationally by Siemens AG of Munich, West Germany. This switch is currently in use as a public exchange in West Germany and South Africa.

Referring to FIG. 1, the operation of exchange 10 will be described in response to an incoming telephone call on trunk 14 or a subscriber line 16. A request for service, called a seizure, occurs on a subscriber line when the instrument handset is taken off-hook. Seizure of a trunk occurs when a remote office selects that trunk for call routing and sends a message which indicates that the trunk has been chosen and data will be coming over that trunk. The line/trunk group detects the seizure and processor 24, shown in FIG. 2, responds by sending the central processor a first message. This message notifies the central processor that the trunk or subscriber line carrying the request for service is in use and therefore not available for use in other calls.

Following the seizure, digits in the form of pulses or tones, which represent the subscriber being called, are received by the line/trunk group over the trunk or subscriber line requesting service. These digits are then sent in the form of a second message by the line/trunk group to the central processor. The central processor always responds to this second message by either notifying the line/trunk group which originated the message that the call can not be completed or by giving instructions on how to complete the connection. If the connection is to be completed the originating line/trunk group is notified where to connect the appropriate trunk or line in switching network 22. The central processor then tells the receiving line/trunk group, which may be any available line/trunk group including the originating line/trunk group, that it is going to be connected to the originating line/trunk group. The central processor also selects a connection path in the switching network which is used to complete the connection between the originating and the receiving line/trunk groups. The call connection is now complete and a trunk and subscriber line or two subscriber lines or two trunks can communicate via line/trunk group connections made through the switching network. When the call has terminated, the trunks and/or subscriber lines are released from service and release messages are sent by the originating and receiving line/trunk groups to the central processor. Each release message notifies the central processor that the respective trunk and/or line is now available for use in other calls.

Figure 4:
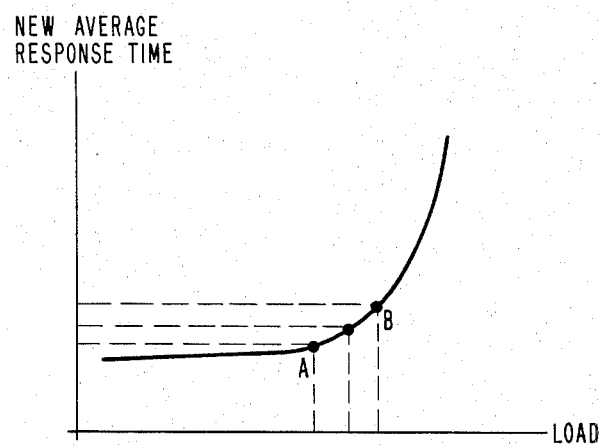
FIG. 4 shows the relationship between the line/trunk group load and average response time of the central processor.

Each line/trunk group processor continuously keeps track of the response time starting when the second message is sent from the line/trunk group to the central processor and ending when the responsive message sent by the central processor is received by the originating line/trunk group. An average of these response times is continuously computed by each line/trunk group according to the following relationship:

new average response time = old average response time +

$$\frac{\text{response time} - \text{old average response time}}{k}$$

k, which is set equal to 8, is a weighing factor which prevents rapid fluctuations in the new average value due to momentary increases in load on the line/trunk group. Consequently, the new average response time will vary with load as shown in FIG. 4.

Predetermined lower and upper threshold values for the new average response time computed by the above equation are entered into the system. These values are represented by "A" and "B" respectively, are shown in FIG. 4.

In addition, each line/trunk group has seven predetermined operational levels designated level 0 to level 6. When the line/trunk group is in level 0 there are not restrictions placed on incoming calls. When the line/trunk group is is level 6 the maximum restriction of incoming calls occurs. The actual restrictions placed on the line/trunk group at operational levels 1 to 5 are a matter of design choice for the system operator.

The system operator will also permanently assign each line and each trunk a priority level from 0 to 6. Level 0 is the lowest priority level, and any line or trunk assigned this level will only be given service when the line/trunk group operational level is 0. If a line or trunk has an assigned priority level of 6 it will always be given service regardless of the operational level of the line/trunk group. Assignment of priority levels is a matter of choice for the system operator based on the relative importance of each incoming line or trunk to the recipient. For example, a trunk which carries long distance calls from Europe will probably be given a high priority level, such as 6, while a local subscriber line will be assigned a much lower priority level.

Figure 5:
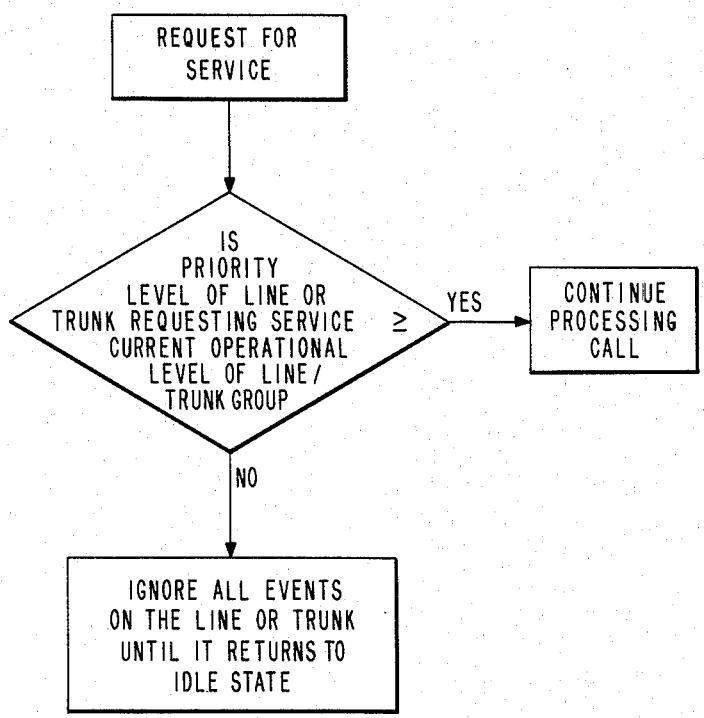
FIG. 5 shows diagrammatically the initial handling of a request for service.

Once a request for service is received over a trunk or line the line/trunk group compares the priority level of the trunk or line with the current operational level of the line/trunk group. The request for service is only granted when this priority level is greater than or equal to the current operational level. FIG. 5 shows a flow chart for programming this operation.

Each line/trunk group continuously compares the new average response time, computed as previously described, with predetermined thresholds "A" and "B", shown in FIG. 4. Whenever the new average response time exceeds upper threshold "B", the line/trunk group detects a system overload and the line/trunk group moves its operational level up one level. This level increase should decrease response time because the number of incoming calls accepted decreases as the operational level increases. If the new average response time is less than lower threshold "B", the line/trunk group reduces its operational level by one level.

Figure 6:
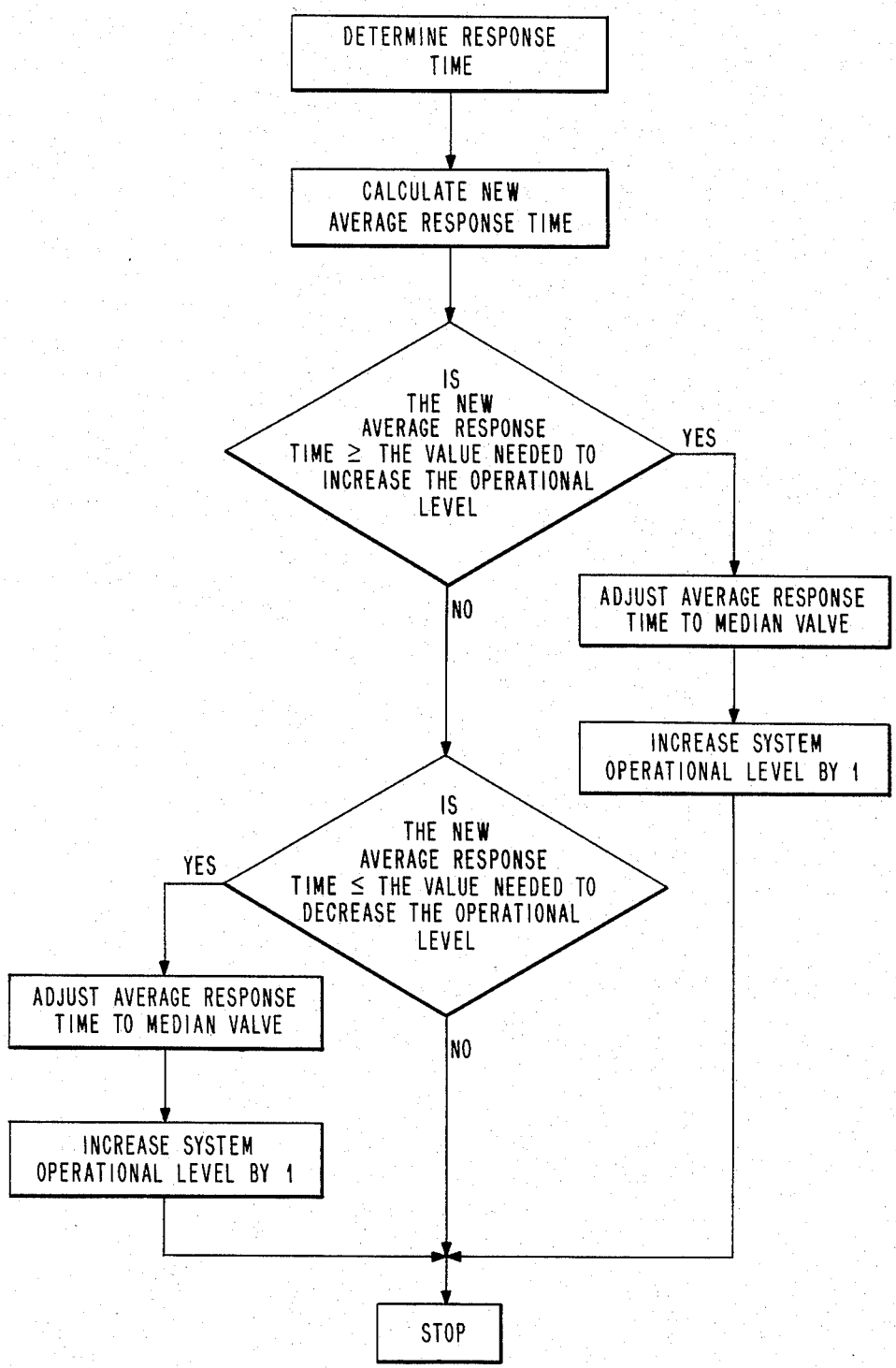
FIG. 6 shows diagrammatically the operational level adjustment in response to the system load.

The adjustment of the operational level in accordance with the computed response time is shown in a flow chart in FIG. 6.

These overload detection and operational level adjustments are made by the line/trunk groups without the knowledge or assistance of the central processor.

However, the central processor does periodically adjust operational levels of all the line/trunk groups. Each line/trunk group processor notifies the central processor every fifteen seconds of its present operational level if the level has changed since the last notification. Every sixty seconds the central processor determines an average operational level by summing the operational levels of all line/trunk groups and dividing that value by the total number of line/trunk groups. The central processor then compares the operational level of each line/trunk group with the average operational level computed. If a line/trunk group's operational level is more than one level higher than the average level the central processor instructs the line/trunk group processor to decrease the line/trunk group operational level to the average level.

An alternate embodiment of the invention, which combines the embodiment already described with local overload detection and control in each line/trunk group, will now be described.

Figure 7:
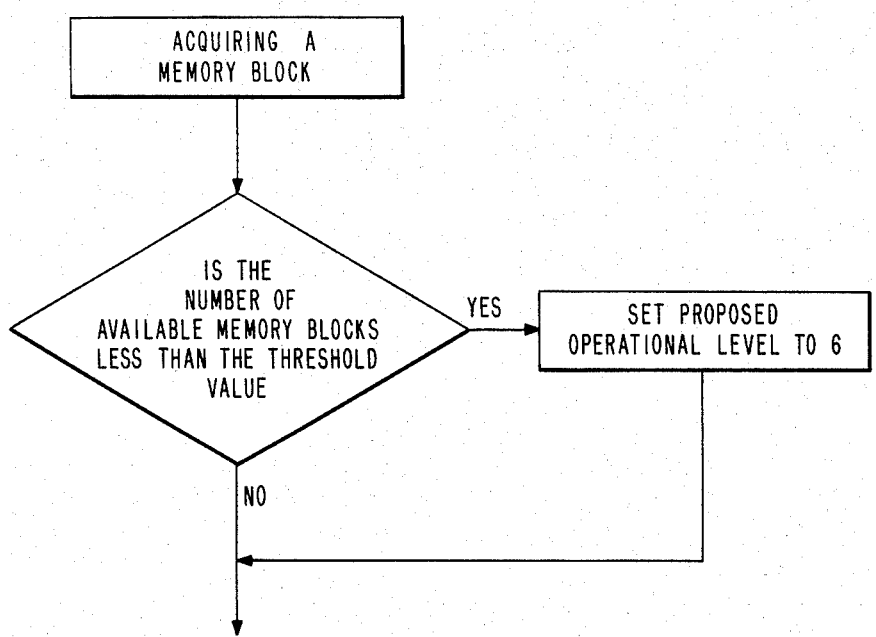
FIGS. 7 and 8 show diagrammatically local overload detection in the line/trunk group.

Referring to FIGS. 2 and 7, line/trunk group processor 24 continually keeps track of the memory available in memory 26. Whenever the amount of memory available in memory 26 is less than 20% of the total available memory, a local overload is detected by the line/trunk group processor and a proposed operational level of 6 is generated.

Figure 8:
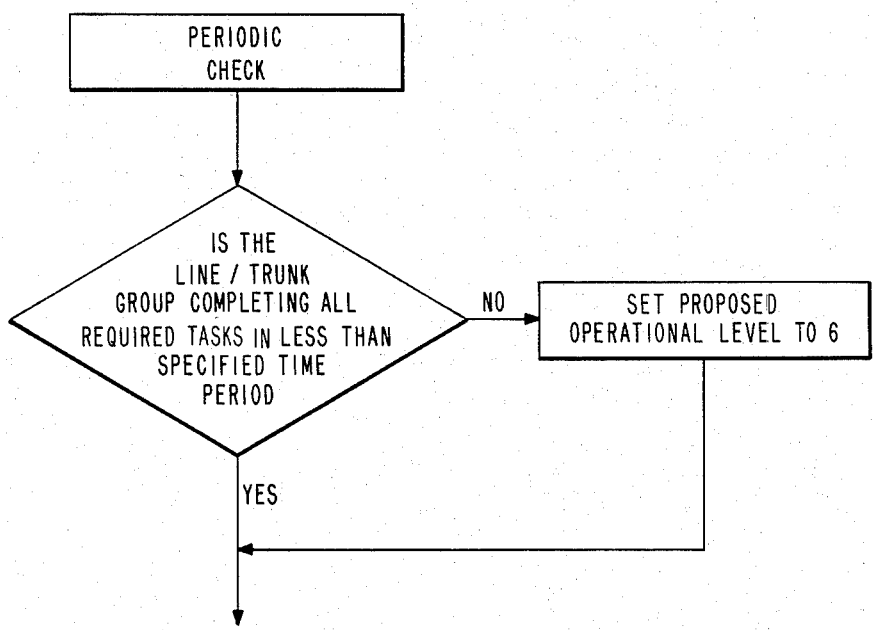

Each line/trunk group is designed so that the internal programming occupies less than 100% of the operating time of the line/trunk group processor. Therefore, the line/trunk group processor checks itself every 400 milliseconds to determine if it has been idle at anytime during the previous 400 millisecond time period. If there was no idle time the processor detects a local overload and a proposed operational level of 6 is also generated. This operations is shown in diagrammatically in FIG. 8.

A proposed operational level equal to the operational level determined from the computation of the new average response time, as previously described, is also generated.

The line/trunk group processor then compares the three proposed operational levels and the highest level becomes the line/trunk group operational level. This operational level is then compared to the priority level of the trunk or line handling an incoming call, as previously described, to determine if a request for service should be granted.

The three mechanisms that propose operational levels act independently so that any change proposed by anyone of the mechanisms can change the operational level at anytime if that proposed level is higher than the current operational level of the line/trunk group.

Figure 9:
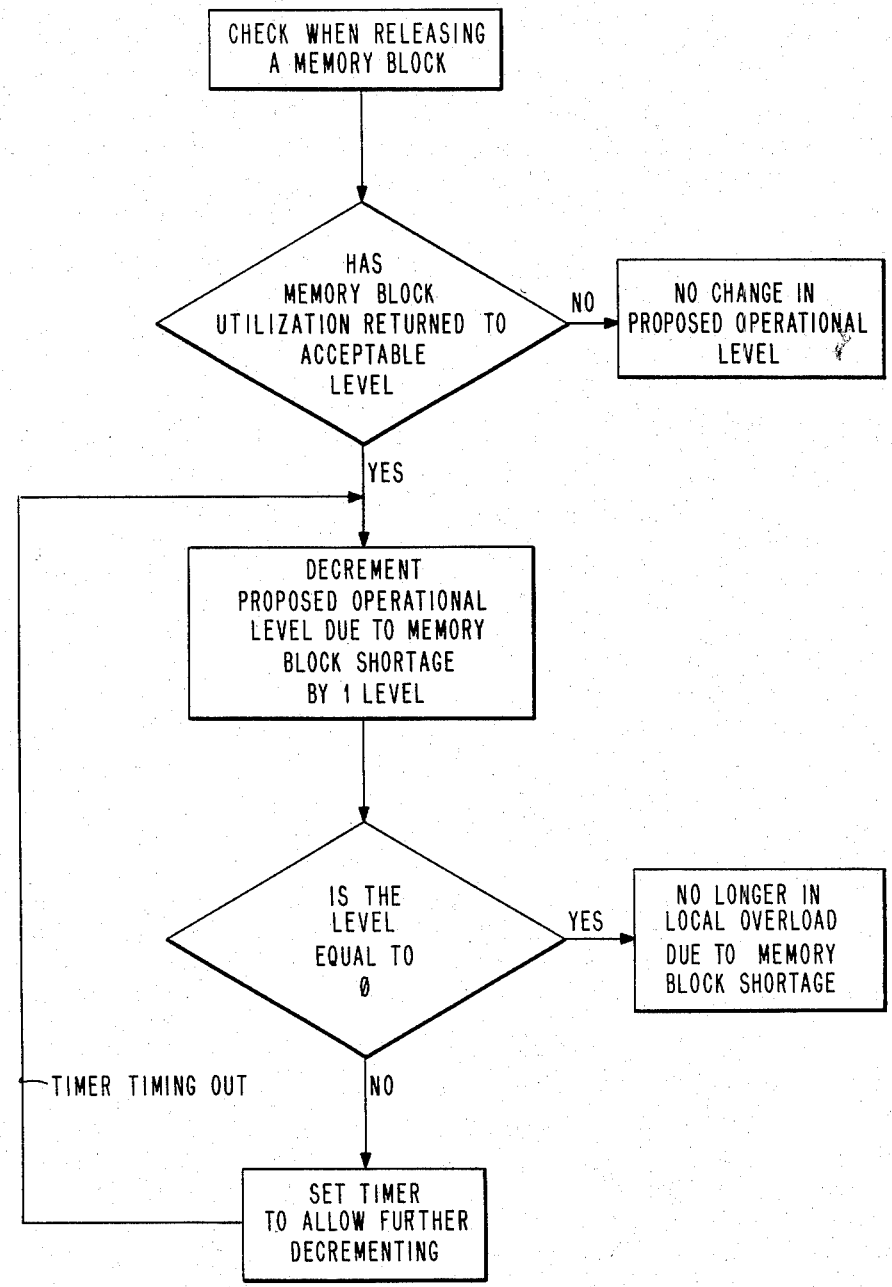
FIGS. 9 and 10 show diagrammatically local overload management in the line/trunk group.

If the operational level is raised to level 6 due to insufficient availability of memory, the level will remain unchanged until the amount of available memory increases to more than 30% of the total available memory. At this point the operational level will be decreased by the line/trunk group processor at the rate of one level every ten seconds until level 0 has been reached. This operation is shown diagrammatically in FIG. 9.

Figure 10:
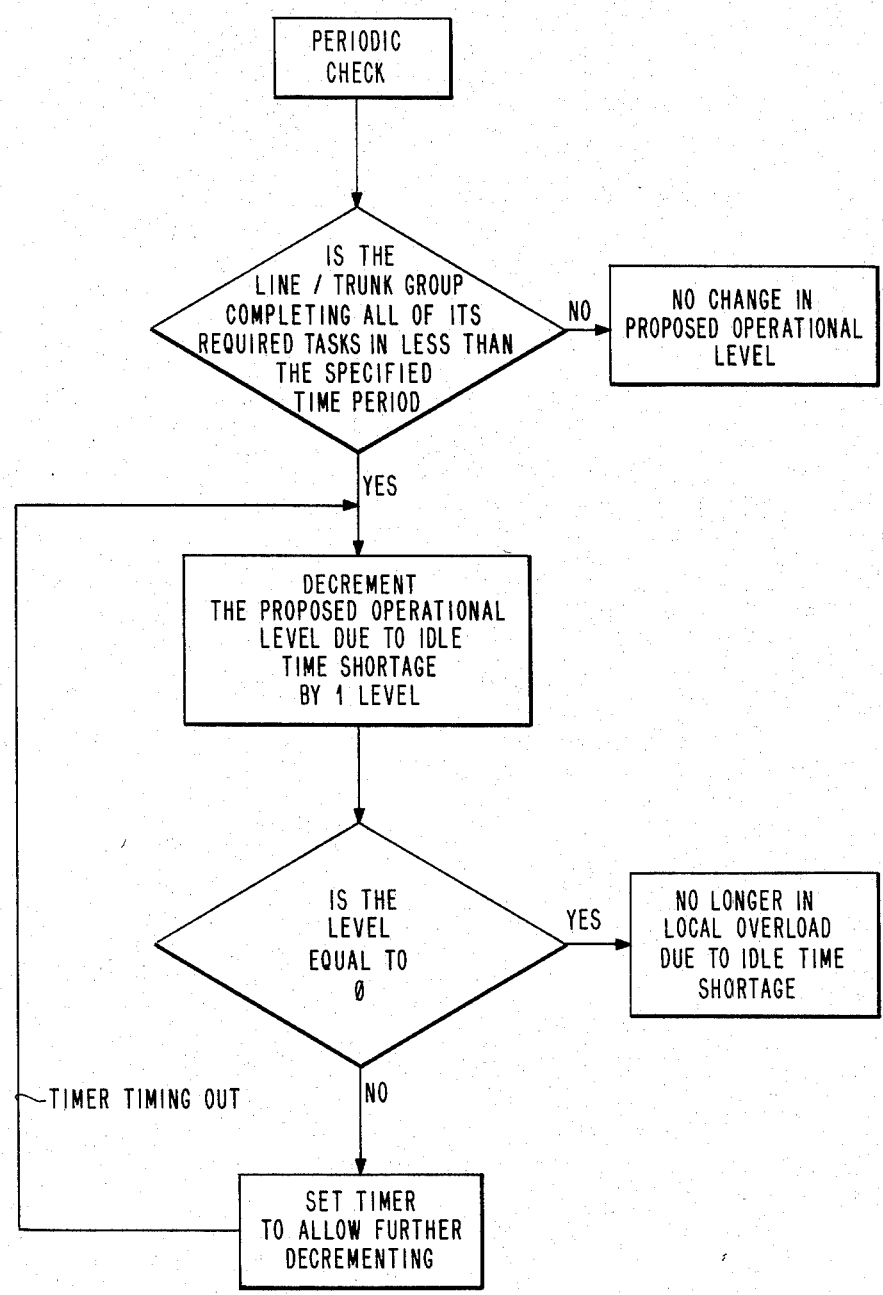

If the operational level is raised to level 6 due to continuous operation of the line/trunk group processor, the level will remain unchanged until the processor is found to be idle at least once in a 200 millisecond period. Once this idle level is detected, the operational level will be decreased by the line/trunk group processor at the rate of one level every ten seconds until level 0 has been reached. This operation is shown diagrammatically in FIG. 10.

However, the operational level will not be reduced in any case below the highest of the three proposed operational levels.

In other embodiments of the invention line/trunk groups can be connected only to subscriber lines, only to trunks or to any combination of subscriber lines and trunks.

There has thus been shown and described a novel method and apparatus for an overload detection and control system which fulfills all the objects and advantages sought. Many changes, modifications, variations and other uses and applications of the subject invention will, however, become apparent to those skilled in the art after considering this specification and the accompanying drawings which disclose embodiments thereof. All such changes, modifications, variations and other uses and applications which do not depart from the spirit and scope of the invention are deemed to be covered by the invention which is limited only by the claims which follow.

What is claimed is:

1. Apparatus for a telecommunications exchange, comprising:
   (a) central processing means for controlling certain operations of said telecommunications exchange;
   (b) at least one line/trunk group connected to said central processing means, said line/trunk group comprising,
      (1) a plurality of telecommunication trunks for receiving and transmitting telecommunication signals;
   (c) a switching means connected to said central processing means and to said line/trunk group enabling said telecommunication trunks to communicate with each other, said switching means comprising,
      (1) means associated with said line/trunk group for sending a message to said central processing means whenever one of said telecommunication trunks is to communicate with another one thereof; and
      (2) means associated with said central processing means for receiving said message and sending a responsive message to said line/trunk group;
   wherein said line/trunk group further comprises system overload detection means comprising,
      (1) means associated with said line/trunk group to measure the time for said central processing means to send said responsive message to said line/trunk group in response to said message sent by said line/trunk group to said central processing means; and
      (2) means responsive to said time for determining the system overload condition.

2. Apparatus for a telecommunication exchange, comprising:
   (a) central processing means for controlling certain operations of said telecommunications exchange;
   (b) at least one line/trunk group connected to said central processing means, said line/trunk group comprising,
      (1) a plurality of subscriber lines for receiving and transmitting telecommunication signals;
   (c) a switching means connected to said central processing means and to said line/trunk group enabling said subscriber lines to communicate with each other, said switching means comprising,
      (1) means associated with said line/trunk group for sending a message to said central processing means whenever one of said subscriber lines is to communicate with another one thereof; and
      (2) means associated with said central processing means for receiving said message and sending a responsive message to said line/trunk;
   wherein said line/trunk group further comprises system overload detection means comprising,
      (1) means associated with said line/trunk group to measure the time for said central processing means to send said responsive message to said line/trunk group in response to said message sent by said line/trunk group to said central processing means; and
      (2) means responsive to said time for determining the system overload condition.

3. Apparatus for a telecommunications exchange, comprising:
   (a) central processing means for controlling certain operations of said telecommunications exchange;
   (b) at least one line/trunk group connected to said central processing means, said line/trunk group comprising,
      (1) at least one telecommunication trunk for receiving and transmitting telecommunication signals; and
      (2) at least one subscriber line for receiving and transmitting telecommunication signals; and
   (c) a switching means connected to said central processing means and to said line/trunk group enabling said subscriber lines and said telecommunication trunks to communicate with each other, said switching means comprising,
      (1) means associated with said line/trunk group for sending a message to said central processing means whenever one of said subscriber lines and said telecommunication trunks is to communicate with another one thereof; and
      (2) means associated with said central processing means for receiving said message and sensing a responsive message to said line/trunk group;
   wherein said line/trunk group further comprises system overload detection means comprising,
      (1) means associated with said line trunk group to measure the time for said central processing means to send said responsive message to said line/trunk group in response to said message sent by said line/trunk group to said central processing means; and
      (2) means responsive to said time for determining the system overload condition.

4. The apparatus of claims 1, 2 or 3, wherein said line/trunk group further comprises means for comparing said time with at least one predetermined threshold, said means being responsive to the relative values of said time and said predetermined threshold for determining said system overload condition.

5. The apparatus of claim 4, wherein said line/trunk group further comprises means for comparing said average of successive measurements of said time with at least one predetermined threshold, said means being responsive to the relative values of said average of successive measurements of said time and said predetermined threshold for determining said system overload condition.

6. The apparatus of claims 1, 2 or 3, wherein said line/trunk group further comprises means for determining the average of successive measurements of said time, said means being responsive to said average for determining the system overload condition.

7. The apparatus of claims 1, 2 or 3, wherein said line/trunk group further comprises means responsive to said system overload condition for changing from at least one operational level to at least one other operational level.

8. The apparatus of claims 1, 2 or 3, further comprising a digital telecommunications exchange, wherein said line/trunk group further comprises local processing means, a memory associated with said local processing means, and means for determining the local overload condition of said line/trunk group.

9. The apparatus of claim 8, wherein said means for determining said local overload condition of said line/trunk group further comprises, means for determining the amount of memory available when said subscriber lines and said telecommunication trunk communicate with each other, said means for determining said local overload condition responsive to said amount of memory available for determining said local overload condition.

10. The apparatus of claim 9, wherein said line/trunk group further comprises means to compare said amount of memory available with a predetermined threshold, said means responsive to the relative values of said amount of memory available to and said predetermined threshold for determing said local overload condition.

11. The apparatus of claim 8, wherein said means for determining said local overload condition of said line/trunk group further comprises, local processing means with adequate capacity to be periodically in an idle state, said means for determining said local overload condition responsive to said frequency of detection of said idle state for determining said local overload condition.

12. The apparatus of claim 11, wherein said line/trunk group further comprises means to compare said frequency of detection of said idle state with a predetermined threshold, said means being responsive to the relative values of said frequency of detection and said predetermined threshold for determing said local overload condition.

13. The apparatus of claim 8 wherein said line/trunk group further comprises means responsive to said local overload condition for changing from at least one operational level to at least one other operational level.

14. The method of determining a system overload in a telecommunication exchange, which comprise the steps of:
(a) sending a message from a line/trunk group, comprising a plurality of telecommunication trunks, to a central processing means, whenever one of said telecommunication trunks is to communicate with another one thereof;
(b) receiving a response message sent from said central processing means to said line/trunk in response to said message;
(c) measuring the time for said responsive message to be sent to said line/trunk group; and
(d) determining said system overload condition based on said time.

15. The method of determining a system overload in a telecommunications exchange, which comprises the steps of:
(a) sending a message from a line/trunk group, comprising a plurality of subscriber lines, to a central processing means, whenever one of said subscriber lines is to communicate with another one thereof;
(b) receiving a responsive message sent from said central processing means to said line/trunk group in response to said message;
(c) measuring the time for said responsive message to be sent to said line/trunk group; and
(d) determining said system overload condition based on said time.

16. The method of determining a system overload in a telecommunications exchange, which comprises the steps of:
(a) sending a message from a line/trunk group, comprising at least one subscriber line and at least one telecommunication trunk, to a central processing means, whenever one of said subscriber lines and said telecommunication trunks is to communicate with another one thereof;
(b) receiving a responsive message sent from said central processing means to said line/trunk group in response to said message;
(c) measuring the time for said responsive message to be sent to said line/trunk group; and
(d) determining said system overload condition based on said time.

17. The method of claims 14, 15 or 16, which further comprises the steps of:
(a) determining the average of successive measurements of said time; and
(b) determining said system overload condition based on said average.

18. The method of claim 17, which further comprises the steps of:
(a) comparing said average with at least one predetermined threshold; and
(b) determining said system overload based on the relative values of said average and said predetermined threshold.

19. The method of claims 14, 15 or 16, which further comprises the steps of:
(a) comparing said time with at least one predetermined threshold; and
(b) determining said system overload based on the relative values of said time and said predetermined threshold.

20. The method of claims 14, 15 or 16, which further comprises the step of changing from at least one operational level to at least one other operational level so that said telecommunications exchange can handle said system overload condition.

21. The method of claims 14, 15 or 16, further comprising a method of determining the local overload condition of said line/trunk group, wherein said exchange is a digital telecommunications exchange and said line/trunk group further comprises local processing means and a memory associated with said local processing means, which comprises the steps of:
(a) determining the amount of memory available whenever one of said subscriber lines or said telecommunication trunks is to communicate with another one thereof; and
(b) determining said local overload condition based on said amount of memory available.

22. The method of claim 21, which further comprises the steps of:
(a) comparing said amount of memory with at least one predetermined threshold; and
(b) determining said local overload based on the relative values of said amount of memory and said predetermined threshold.

23. The method of claims 14, 15 or 16, further comprising a method of determining said local overload condition of said line/trunk group, wherein said exchange is a digital telecommunications exchange and said line/trunk group further comprises local processing means with adequate capacity to be periodically in an idle state, which comprises the steps of:
(a) detecting the frequency of said idle state; and
(b) determining said local overload condition based on said frequency of said idle state.

24. The method of claim 23, which further comprises the steps of:
(a) comparing said frequency of said idle level with at least one predetermined threshold; and (b) determining said local overload based on the relative values of said frequency of said idle level and said predetermined threshold.

25. The method of claims 14, 15 or 16, which further comprises the step of changing from at least one operational level to at least one other operational level so that said telecommunications exchange can handle said local overload condition.

* * * * *